W. C. GOULD.
NUT-LOCK.

No. 186,421.   Patented Jan. 23, 1877.

Witnesses:
Henry L. Case
Tappen Townsend

Inventor
William C. Gould

UNITED STATES PATENT OFFICE.

WILLIAM C. GOULD, OF NEW YORK, N. Y.

IMPROVEMENT IN NUT-LOCKS.

Specification forming part of Letters Patent No. 186,421, dated January 23, 1877; application filed October 15, 1875.

*To all whom it may concern:*

Be it known that I, WILLIAM C. GOULD, of the city, county, and State of New York, have invented certain new and useful Improvements for Securing and Locking Nuts in Position after being screwed on the ends of bolts, of which the following is a specification:

My invention relates to holding bolt-nuts to their place, at any desired point, when being wrenched; and consists of a plate or plates fastened to a washer, which may or may not have a depression under said plate or plates, and which plate or plates are fastened to said washer by clasps, rivets, screws, or by soldering, each plate to contain one or more lugs or points, over which the corners of the nuts will slide; and as each point is passed it can be turned up behind the corner of the nut, either by spring or mechanical force.

These methods of fastening the plates will allow of the use of greater variations in the form of both washers and plates than those described in my patent dated April 13, 1875.

Figure 1:
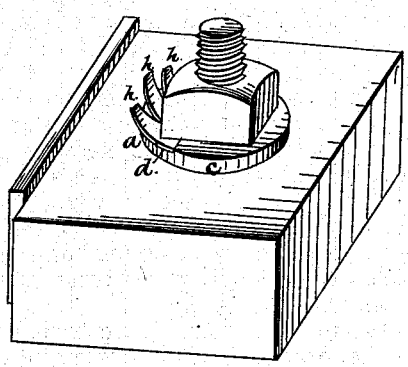

In the accompanying drawing, Figure 1 represents a top view of my nut-lock with the several parts in position as when locked by plate $a$. C shows the washer, and $h\ h\ h$ show the points that lock the nut.

Figure 2:
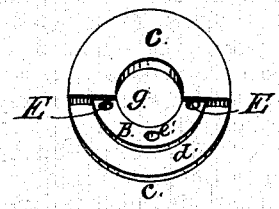

Fig. 2 represents a metal washer, with a depression, B, for the reception of plate $a$, and a still deeper depression, $d$, to give room for points $h\ h\ h$ when in position to bend down into and out of the way of the corners of the nut on being locked or unlocked. $e'$ shows a hole on the depression B, and near the center of washer C, which may be used for a rivet or screw to fasten said washer to plate $a$. E E show two holes — one on each side of hole $e'$ — for the passage of clasps $f f$, for the purpose of holding plate $a$ to washer C; or, if preferred, rivets or screws may be passed through holes E E, and through opposite holes made in plate $a$, in place of clasps $f f$. $g$ shows a hole for the bolt.

Figure 3:
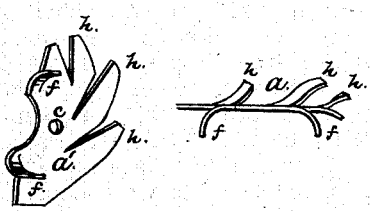

Fig. 3 represents the locking-plate $a$ under two views. The larger view shows plate $a$ separate from washer C, with points $h\ h\ h$, which, when turned up behind the corner of the nut, prevents its turning back. The clasps $f f$ help to hold plate $a$ to washer C, when passed through holes E E in washer C and clinched. $e$ shows a hole near the center of plate $a$, through which a rivet or screw may be passed into hole $e'$ in washer C, to hold the plate to said washer. The smaller view of plate $a$ presents it in a different position, and also shows clasps $f f$ and points $h\ h\ h$. Some of these points may be dispensed with, for one may be used with a different form of nut.

Figure 4:
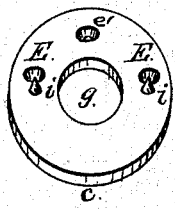

Fig. 4 shows washer C bottom side up, showing points $i\ i$, which, when sunk in the object on which the washer rests, will keep it in place. E E show two holes, with slight countersinks on the under side, for clinching clasps or rivets. $e'$ shows a hole and countersink also.

In using washer C on a metal surface, points $i\ i$ may be dispensed with, and said washer, instead of being made round, may have a square side or end to rest against a projection on said metal surface, or, when required, may be made to catch the nearest corner to hold said washer in place.

The plates may also be made of any suitable material, and in various forms, such as turning up the outer edge in the shape of lugs or springs; or it may be made to surround the bolt in whole or in part with ratchet points, or can be made so as to dispense with a washer by making the plate of sufficient size, form, and thickness to answer for both washer and plate, with points made thinner than the rest of the plate; or said plates may rest on a common washer loosely, or on any other surface with a recess, so formed that the spring-points can bend below the surface on which the plate rests.

Any of the plates mentioned in connection with a washer may be fastened to said washer, as described, but may also have clasps passing between the bolt and plate, or over the ends of the washers.

What I claim as new, and desire to secure by Letters Patent, is—

Plate $a$, with one or more points, $h$, with hole $e$ and clasps $f f$, in combination with washer C, having depression B and $d$, with holes E E and $e$, and with points $i\ i$, as set forth.

In testimony whereof I have hereunto signed my name this 13th day of October, 1875.

WILLIAM C. GOULD.

Witnesses:
 HENRY L. CASE,
 TAPPEN TOWNSEND.